Figure 1:
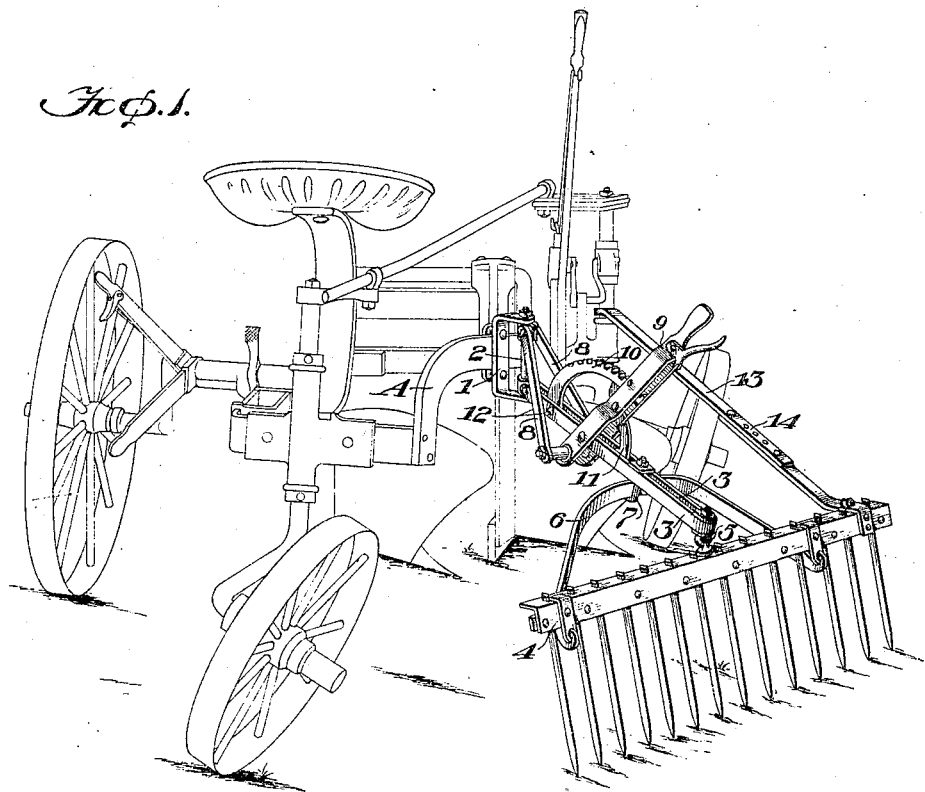

E. B. BARROWS.
HARROW ATTACHMENT FOR PLOWS.
APPLICATION FILED JULY 3, 1908.

980,741.

Patented Jan. 3, 1911.

E. B. BARROWS.
HARROW ATTACHMENT FOR PLOWS.
APPLICATION FILED JULY 3, 1908.
980,741.
Patented Jan. 3, 1911.
2 SHEETS—SHEET 2.
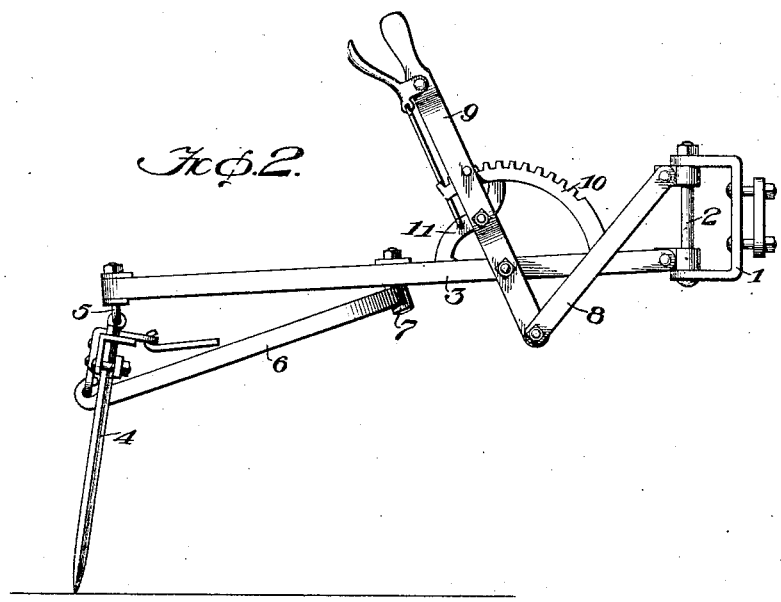
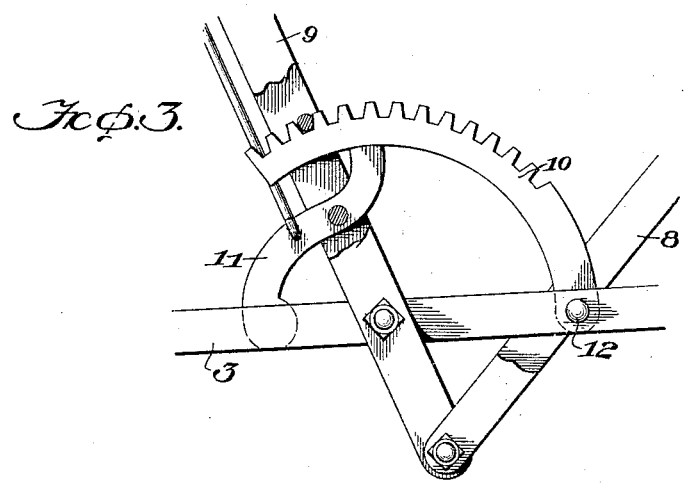

UNITED STATES PATENT OFFICE.

EMERSON BURDETT BARROWS, OF SANDWICH, ILLINOIS.

HARROW ATTACHMENT FOR PLOWS.

980,741.   Specification of Letters Patent.   Patented Jan. 3, 1911.

Application filed July 3, 1908.  Serial No. 441,802.

*To all whom it may concern:*

Be it known that I, EMERSON BURDETT BARROWS, a citizen of the United States, residing at Sandwich, in the county of DeKalb and State of Illinois, have invented certain new and useful Improvements in Harrow Attachments for Plows, of which the following is a specification.

My invention relates to an improvement in harrow attachments for plows, and the object is to provide means whereby the rake or harrow can be shifted to different positions causing the rake to be forced into the ground for breaking up the earth and for raising the same.

The invention consists of certain novel features of construction and combinations of parts which will be hereinafter described and pointed out in the claims.

In the accompanying drawings: Figure 1 is a perspective from the rear; Fig. 2 is a view in side elevation of the attachment; and Fig. 3 is a detail.

A represents the frame of a wheeled plow, and to one side of the frame a bracket 1 is secured and through the free ends of the bracket a bolt 2 extends. Pivotally connected to the bolt are arms 3, 3, which are parallel with each other forming an elongated slot therebetween. A rake 4 has a swivel connection 5 with the arms 3, which permits of the rake being turned to any angle. A yoke 6 is pivotally connected to the rake and is connected to the arms 3 by an eye-bolt 7, which holds the rake in any of its adjusted positions by clamping the yoke 6 to the arms 3.

Braces 8, 8 are connected to the bolt 2 and at their lower ends a lever 9 is pivotally supported. The lever 9 is forked permitting it to straddle the arms 3 and the rack-segment 10 in which it engages by a pawl 11, the segment being connected to the bolt 12. It will be seen that when the pawl 11 is raised the segment will drop, thus allowing the lever to be moved in any position and when the pawl is allowed to be dropped it will again force the segment up and lock the lever in its adjusted position. When the lever is drawn forward the rake will be elevated and when the lever is thrown rearward the rake will be caused to enter the ground for the purpose of breaking up the soil.

The eye-bolt 7 being adjustable through the slot between the arms 3, permits the rake to be adjusted to most any angle, and as the arms are pivotally connected to the bolt 2 the rake can be shifted from one side of the plow to the other as desired by the operator. A draw-rod 13 is connected to one end of the rake and the frame of the plow for holding the rake in position. This rod is provided with a clamp 14, which permits of the lengthening and shortening of the rod.

It is evident that slight changes might be made in the form and arrangement of the several parts described without departing from the spirit and scope of my invention, and hence I do not wish to be limited to the exact construction herein set forth, but:—

Having fully described my invention, what I claim as new and desire to secure by Letters Patent, is:—

1. In an attachment for plows, the combination with a plow, of arms pivotally connected to the plow, a rake having a swivel connection with the arms, braces connected to the plow, a lever supported in the braces and connected to the arms, a rack segment pivoted to the arms and a pawl pivoted to the lever for engaging the segment for locking the lever in adjusted position for raising and lowering the rake.

2. In an attachment for plows, the combination with a plow, of a bracket secured to the plow, a bolt extending through the bracket, arms pivotally connected to the bolt, a rake having a swivel connection with the arms, braces pivotally connected to the bolt, a forked lever pivoted to the arms and supported in the braces, a rack segment pivoted to the arms and adapted to engage the lever, and a pawl pivoted to the lever for forcing the rack segment into engagement with the lever whereby the lever is locked in its adjusted positions for raising and lowering the rake.

In testimony whereof I affix my signature, in the presence of two witnesses.

EMERSON BURDETT BARROWS.

Witnesses:
 CHARLES DICKERMAN,
 B. WILSEY.